Figure 1:
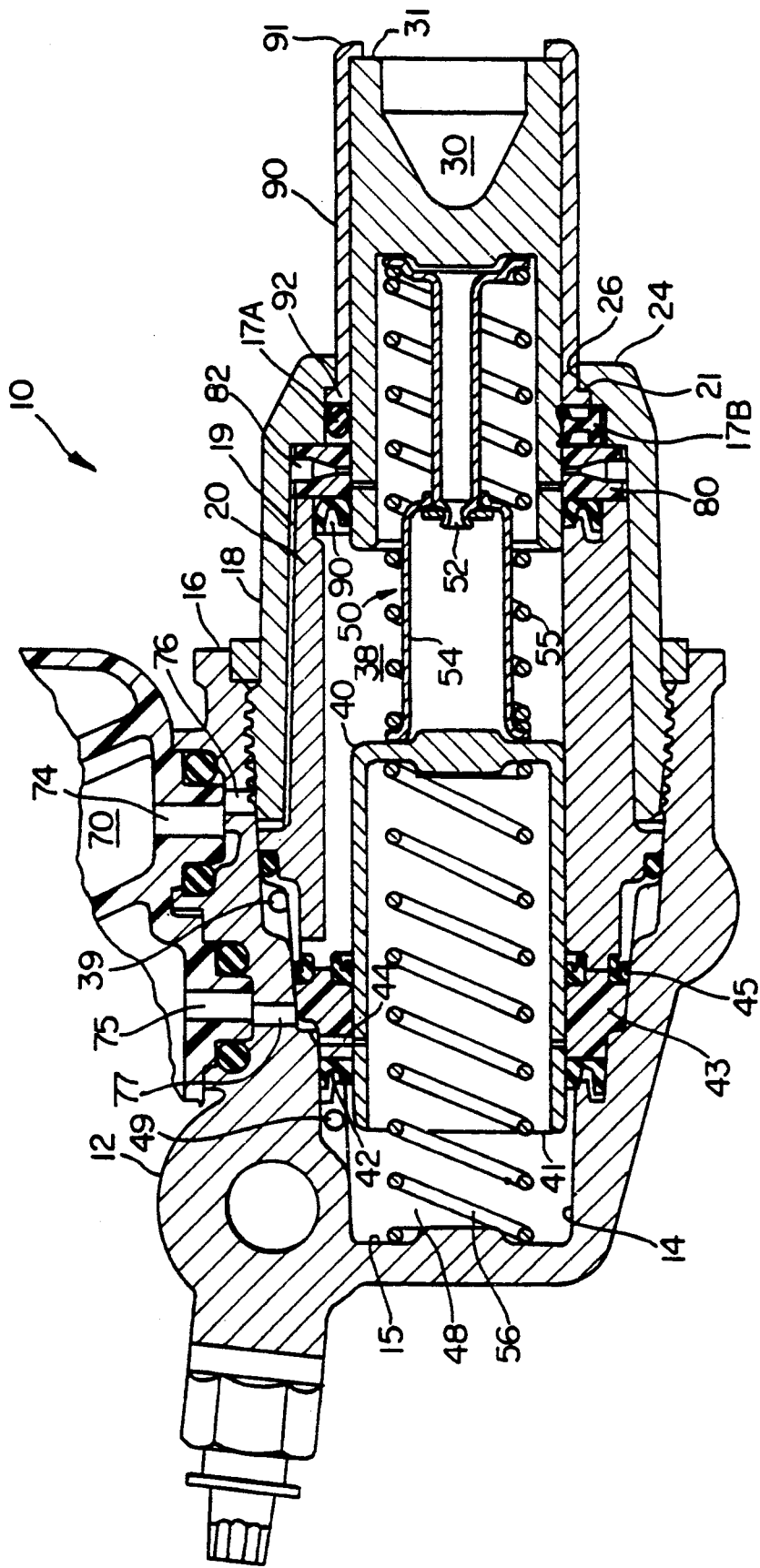

United States Patent [19]

Zander

[11] Patent Number: 5,142,965
[45] Date of Patent: Sep. 1, 1992

[54] MASTER CYLINDER PISTON RETAINER

[75] Inventor: Richard A. Zander, Niles, Mich.

[73] Assignee: Allied-Signal Inc., Morristown, N.J.

[21] Appl. No.: 751,430

[22] Filed: Aug. 28, 1991

[51] Int. Cl.⁵ .................................................. F01B 1/00
[52] U.S. Cl. ...................................... 92/76; 92/170.1; 60/562
[58] Field of Search ............... 60/551, 562, 581, 585, 60/588, 589; 92/61, 76, 168 B, 170.1, 171.1

[56] References Cited

U.S. PATENT DOCUMENTS

| | | | |
|---|---|---|---|
| 3,166,908 | 1/1965 | Chouings | 92/168 B |
| 3,266,383 | 8/1966 | Cairns | 92/170.1 |
| 4,249,381 | 2/1981 | Gaiser | 60/562 |
| 4,527,395 | 7/1985 | Gaiser et al. | 60/562 |
| 4,745,751 | 5/1988 | Gaiser | 60/589 |

FOREIGN PATENT DOCUMENTS 887631  1/1962  United Kingdom .................. 60/562

*Primary Examiner*—Edward K. Look
*Assistant Examiner*—F. Daniel Lopez
*Attorney, Agent, or Firm*—Larry J. Palguta; Ken C. Decker

[57] ABSTRACT

The master cylinder piston retaining member (90, 190) comprises either a flexible, ribbed bellows type member (190) or a nonflexible member (90) attached at one end of the master cylinder (10) in order to retain the primary piston (30) within the master cylinder (10). A cartridge master cylinder (10) having an end member (18) attached at one end (16) and retaining a sleeve member (20) within the bore (14), includes a pair of pistons (30, 40) with one piston (30) biased by a top hat construction (50) comprising one member (52) telescopically and slidable received within the other member (54) and having a spring (55) extending therebetween so that the maximum expansion of the spring (55) is limited. The primary piston (30) of the master cylinder (10) is positioned within an opening (26) of the end member (18). The piston retaining member (90, 190) is seated at one end within the end member (18) in order to be attached therewith and at the other end includes a radially inwardly extending flange (91, 191) which engages an axial end (31) of the primary piston (30) in order to limit by a predetermined amount the position of the primary piston (30) relative to the master cylinder (10). The piston retaining member (b 90, 190) enables a previously used top hat construction for the secondary piston (40) to be replaced with merely a spring (56).

3 Claims, 2 Drawing Sheets

MASTER CYLINDER PISTON RETAINER

The present invention relates to a master cylinder piston retainer, and in particular to a primary piston retainer for a cartridge master cylinder which includes a short length and compact structure.

Cartridge master cylinders have been disclosed previously in patents such as Steer U.S. Pat. No. 4,790,138. The cartridge master cylinder includes a pair of pistons slidably received within a sleeve member retained within the master cylinder bore by a bearing member Each piston is biased rearwardly, to a limited extent, by a top hat construction. Even though the top hat constructions limit the extent each of the pistons is biased by the spring mechanisms therein toward the rear of the master cylinder, the primary piston remains free to be removed from the master cylinder either by jarring, vibration, accident. Additionally, the primary piston may experience damage during manufacture and assembly because approximately half of the piston extends outwardly of the bearing member and in an exposed position. It is highly desirable to provide a cartridge master cylinder having a mechanism for limiting the rearward movement of the primary piston so that the primary piston may not be removed, either intentionally or by accident. The retention mechanism should ideally provide protection for the primary piston so that it is not damaged during manufacture or assembly. Further, it is highly desirable that the overall number of parts of the master cylinder be reduced, preferably by the utilization of a retention mechanism.

The present invention provides solutions to the above problems by providing a master cylinder with a piston retainer, comprising a master cylinder housing with a bore extending axially therein, a reservoir providing fluid for said bore, an end of said housing having an end member attached thereto and retaining a sleeve member within said bore, a pair of pistons associated with said master cylinder housing and one of said pistons extending through an opening in said end member, the one piston retained within the opening by means of a retaining member, the retaining member comprising at one end a radially inwardly extending flange which engages an axial end of the one piston disposed outwardly of the master cylinder, and a radially outwardly extending flange engaging a shoulder of said end member at said opening such that the retaining member is connected with said bearing member, so that the one piston may move axially through said opening until engagement of the axial end with the inwardly extending flange.

Figure 2:
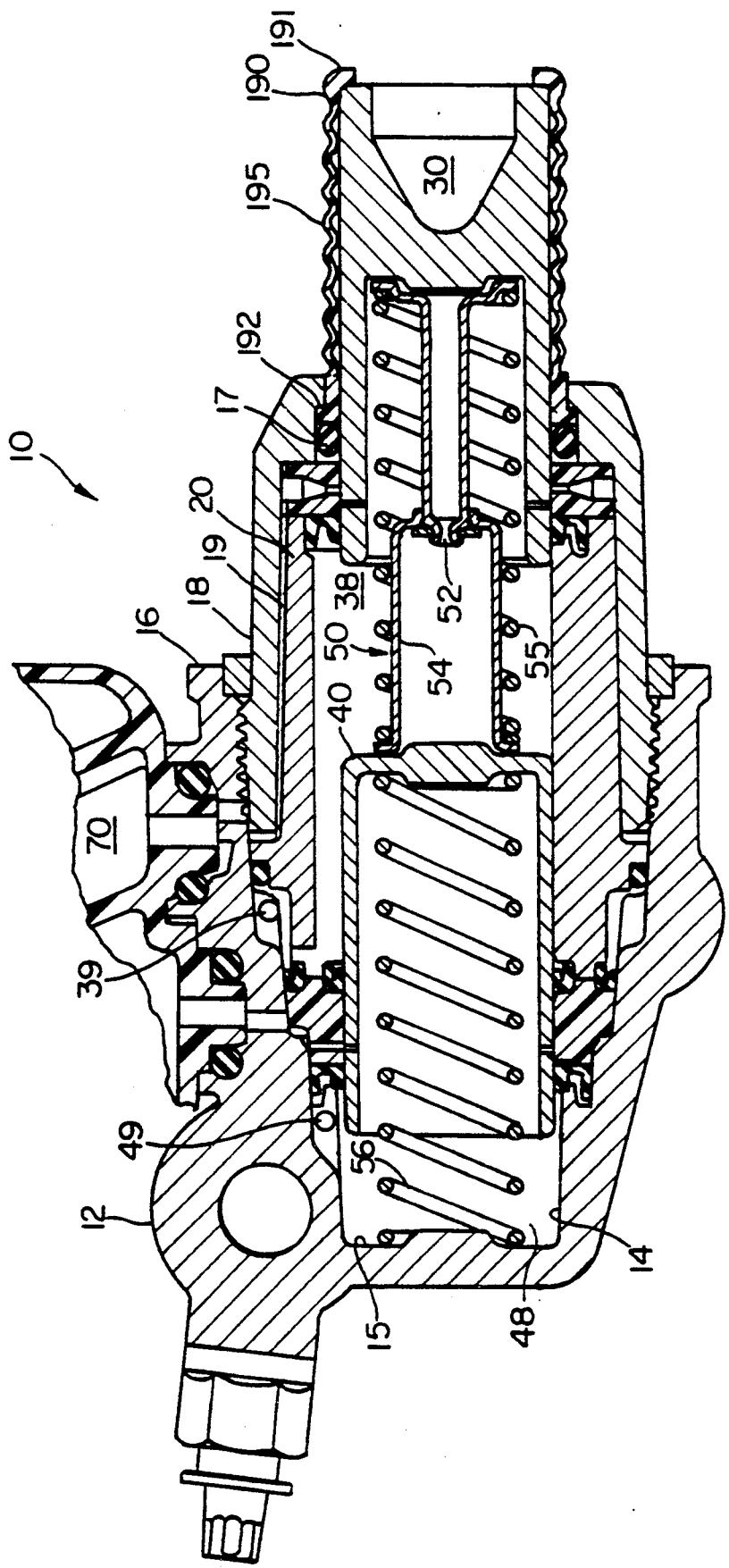

The present invention is described in detail with reference to the drawings which illustrate embodiments in which:

FIG. 1 is an illustration of a cartridge master cylinder with a nonflexible retention member; and FIG. 2 illustrates a cartridge master cylinder with a flexible retention member.

The master cylinder of the present invention is designated generally by reference numeral 10 in FIG. 1. Master cylinder 10 includes housing 12 having therein longitudinal bore 14 with open end 16. Open end 16 threadably receives end member 18 which positions sleeve member 20 within bore 14. End member 18 extends radially inwardly at end 24 to provide opening 26 through which extends first or primary piston 30. First piston 30 is spaced apart from secondary piston 40 by top hat construction 50 which includes one member 52 telescopically and slidably received within the other member 54, and spring 55. Second piston 40 is spaced apart from bore end 15 by spring 56. Reservoir 70 is disposed atop and attached to housing 12. End member 18 includes longitudinal groove or passageway 19 between the interior surface of bearing member and sleeve member 20, as described previously in U.S. Pat. No. 4,474,005 incorporated herein by reference. Hydraulic fluid contained within reservoir 70 may communicate through reservoir opening 74, housing opening 76 and passageway 19 to land opening 82 and land 80. Land 80 abuts pumping seal 90. Primary pressure chamber 38 communicates with outlet 39. Forward reservoir opening 75 provides for hydraulic fluid communication to bore 14 via housing opening 77. Secondary piston 40 includes at end 41 flexible seal 42 which engages an interior surface of bore 14, retainer 43 which includes radial opening 44 communicating with housing opening 77, and seal member 45 engaging the interior of bore 14. Bore 14, secondary piston 40, seal 42, retainer 43, and seal 45 define secondary pressure chamber 48 which communicates with outlet 49.

Disposed about the exteriorly extending end of primary piston 30 is piston retaining member 90. Piston retaining member 90 comprises longitudinally extending retention member or mechanism having at one end a radially inwardly extending flange 91 which abuts the axial end 31 of piston 30, and at the opposite end a radially outwardly extending flange 92 which abuts bearing member shoulder 21 located adjacent end opening 26. The abutment of outwardly extending flange 92 with shoulder 21 locates retaining member 90 in a stationary position relative to end member 18. Outwardly radially extending flange 92 abuts seal 17 which may be annular seal 17A as shown in the upper portion of the picture, or an I-shaped seal 17B as shown in the bottom portion of FIG. 1. Retaining member 90 retains primary piston 30 within the master cylinder so that it may not be removed or fall out during assembly, shipping and connection with the braking system of a vehicle. Retaining member 90 protects the primary piston from being damaged during assembly and any servicing. It also guides and supports the primary piston for movement relative to end member 18. Additionally, retaining member 90 effects a reduction in the total number of parts of master cylinder 10. As illustrated in U.S. Pat. No. 4,790,138, the secondary piston is biased away from the end wall of the master cylinder by a top hat construction. The top hat construction determines the extent of extension of the secondary spring by effectively "caging" the spring. A freely expanding spring could not be used because the secondary piston would be biased further toward the right in U.S. Pat. No. 4,790,138 and cause, by reaction, the primary piston to move outwardly from the master cylinder. As a result of the implementation of retaining member 90 which limits the outward extension or movement of primary piston 30 relative to end member 18, the two part top hat construction comprising two metallic members telescopically and slidably engaged has been eliminated and just spring 56 may be utilized to bias secondary piston 40 toward the right side of the master cylinder. Thus, the two part top hat construction for the secondary piston has been eliminated and replaced by the one part retaining member 90, to effect a reduction in the total number of parts in the master cylinder.

FIG. 2 illustrates an alternative embodiment of the piston retaining member. Parts of the master cylinder are identical to those illustrated in FIG. 1, and therefore are identified by the same numbers. Piston retaining member 190 comprises a collapsible or movable retaining member which includes ribbed or flexible portion 195 located between radially inwardly extending flange 191 and radially outwardly extending flange 192. Thus, as the piston moves inwardly, retaining member 190 can collapse therewith and follow the movement of the piston. Retaining member 190 may be desirable when the connection with the brake Pedal mechanism is not of the type which would extend through the stationary retaining member 90 illustrated in FIG. 1, and thus necessitates a collapsible retaining member. Piston retaining member 190 provides the same advantages as discussed above for the master cylinder and retaining member of FIG. 1, in addition to providing the feature of a collapsible retention mechanism which is displaceable with primary piston 30.

I claim:

1. A master cylinder with a piston retaining member, comprising a master cylinder housing with a bore extending axially therein, a reservoir providing fluid for said bore, an end of said housing having an end member attached thereto and retaining a sleeve member within said bore, a pair of pistons associated with said master cylinder housing and one of said pistons extending exteriorly of the end member by means of an opening in said end member, the one piston retained within the opening by means of the piston retaining member, the piston retaining member comprising at one end a radially inwardly extending flange which engages an axial end of the one piston disposed exteriorly of the master cylinder, and a radially outwardly extending flange engaging a shoulder of said end member at said opening such that the piston retaining member is connected with said end member, so that the one piston may move axially outwardly through said opening until engagement of the axial end with the inwardly extending flange, wherein the piston retaining member comprises a multi-ribbed expandable member which may expand axially to a predetermined maximum length for retention of said one piston.

2. The master cylinder and retaining member in accordance with claim 1, wherein the other of said pistons is biased by a spring toward said retaining member and biased by spring means located between the pistons, an at-rest position of the other piston being determined by engagement of the other piston wit the spring means of the one piston and engagement of the axial end of the one piston with the radially inwardly extending flange.

3. The master cylinder and retaining member in accordance with claim 2, wherein the spring means comprises a compression spring of a top hat assembly wherein one assembly member is telescopically and slidably received within another assembly member and the compression spring extends between the assembly members such that full extension of the assembly members relative to one another determines the extent of expansion of said compression spring.

* * * * *